US006158692A

United States Patent [19]

Abild et al.

[11] Patent Number: 6,158,692

[45] **Date of Patent: *Dec. 12, 2000**

[54] MAIN DECK CARGO DOOR ELECTRIC LOCK SYSTEM

[75] Inventors: Vernon L. Abild, Kirkland; Stephen J. Huard, Everett, both of Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/008,279

[22] Filed: Jan. 16, 1998

Related U.S. Application Data

[63] Continuation-in-part of application No. 08/574,837, Dec. 19, 1995, abandoned.

[51] Int. Cl.[7] ........................ B64C 1/14

[52] U.S. Cl. ........................ 244/129.5

[58] Field of Search ........................ 244/129.4, 129.5; 49/141; 340/542, 545

[56] References Cited

U.S. PATENT DOCUMENTS

| | | | |
|---|---|---|---|
| 3,718,171 | 2/1973 | Godwin | 244/129.5 |
| 4,522,359 | 6/1985 | Church et al. . | |
| 4,681,286 | 7/1987 | Church et al. | 244/129.5 |
| 4,806,910 | 2/1989 | Salzer . | |
| 4,915,326 | 4/1990 | Plude . | |
| 4,994,722 | 2/1991 | Dolan et al. . | |
| 5,251,851 | 10/1993 | Herrmann et al. . | |
| 5,381,065 | 1/1995 | Jones . | |
| 5,823,473 | 10/1998 | Odell et al. | 244/129.5 |
| 5,881,973 | 3/1999 | Agajanian et al. | 244/129.5 |

*Primary Examiner*—Peter M. Poon
*Assistant Examiner*—Tien Dinh
*Attorney, Agent, or Firm*—Conrad O. Gardner

[57] ABSTRACT

An all electric remote control system for a pressurized load carrying non-plug cargo door whose electric lock system is isolated from the remainder of the control system to preclude common mode electrical failures from attempting to unlock and unlatch the door.

6 Claims, 6 Drawing Sheets

MAIN DECK CARGO DOOR ELECTRIC LOCK SYSTEM

CROSS-REFERENCE TO RELATED APPLICATIONS

This application is a continuation-in-part of prior application No. 08/574,837, filed Dec. 19, 1995, abandoned.

BACKGROUND OF THE INVENTION

1. Field of the Invention

This invention relates to aircraft cargo doors and more particularly to cargo door control and indication.

2. Description of the Prior Art

U.S. Pat. No. 4,915,326 to Plude shows an aircraft exit door locking system in which an exit door is automatically locked depending on three dissimilar inputs to a locking system.

The following models have similarities but are significantly different in system design. The 757-200PF provides remote control operation of the Main Deck Cargo Door. However, this system is hydraulically actuated without the same degree of system isolation. The architecture of these electrically controlled, hydraulically actuated systems is significantly different from the 767-300 Freighter Main Deck Cargo Door electrically controlled, electromechanical actuated systems.

The 747-400 Freighter Nose Cargo Door (and earlier versions) provide control near the door on the main deck. However the architecture of the latch and lock systems are significantly different than the 767-300 Freighter Main Deck Cargo Door latch and lock systems.

U.S. Pat. No. 4,681,286 to Church describes a flight deck door anti-hijacking latch/lock mechanism and electric release switch. This device prevents unwanted passengers from entering the flight deck. The consequences of an interior flight deck door locking mechanism failing to perform its function is significantly less severe than the pressurized airframe load carrying non-plug large cargo door locking and latch mechanisms failing to perform their function. The functionality and architecture of this system is significantly different than the 767-300 freighter main deck cargo door latch and lock systems.

SUMMARY OF THE INVENTION

A preferred embodiment of the present invention comprises an apparatus which electrically locks a cargo door enabling complete electric operation of a cargo door from a remote location. The electric lock system is isolated from the remainder of the electrical control system precluding common mode electrical failures from attempting to unlock and unlatch the pressurized, airframe load carrying, non-plug large cargo door which is remote from the flight deck.

DESCRIPTION OF THE PREFERRED EMBODIMENT

Problem:

Door operator control station located remote from pressurized, airframe load carrying non-plug cargo door did not lend for a manually actuated lock system. The remotely actuated electric lock system must provide an equivalent level of inherent protection against common mode failures as a typical manual (mechanical) lock actuation system.

Solution:

The preferred embodiment of the present invention provides an electrically actuated lock system which is electrically isolated from the remainder of the electrical control system precluding common mode electrical failures from attempting to unlock and unlatch the non-plug cargo door. The lock system provides its function as commanded. Lock/unlock is commanded by a switch on the control panel at the aft end of the flight deck adjacent to the crew entry door.

Description:

The electrical lock system is isolated from the remainder of the electrical control system to preclude common mode electrical failures from attempting to unlock and unlatch the door. Isolation is provided by the following design features (Also refer to circuit diagrams):

1. Close/latch control systems and lock system utilize no common components (circuit breakers, wire, switches connectors, etc.). The systems are completely separate.

2. Different electrical power requirements for the latch and lock actuators (3 phase Vs single phase power).

3. Lock control system does not use the Proximity Switch Electronics Unit (PSEU), the latch system does.

4. Grounded shields surrounding specific wires provide separation and hot short protection.

5. Physical separation of specific circuits.

Figure 6:
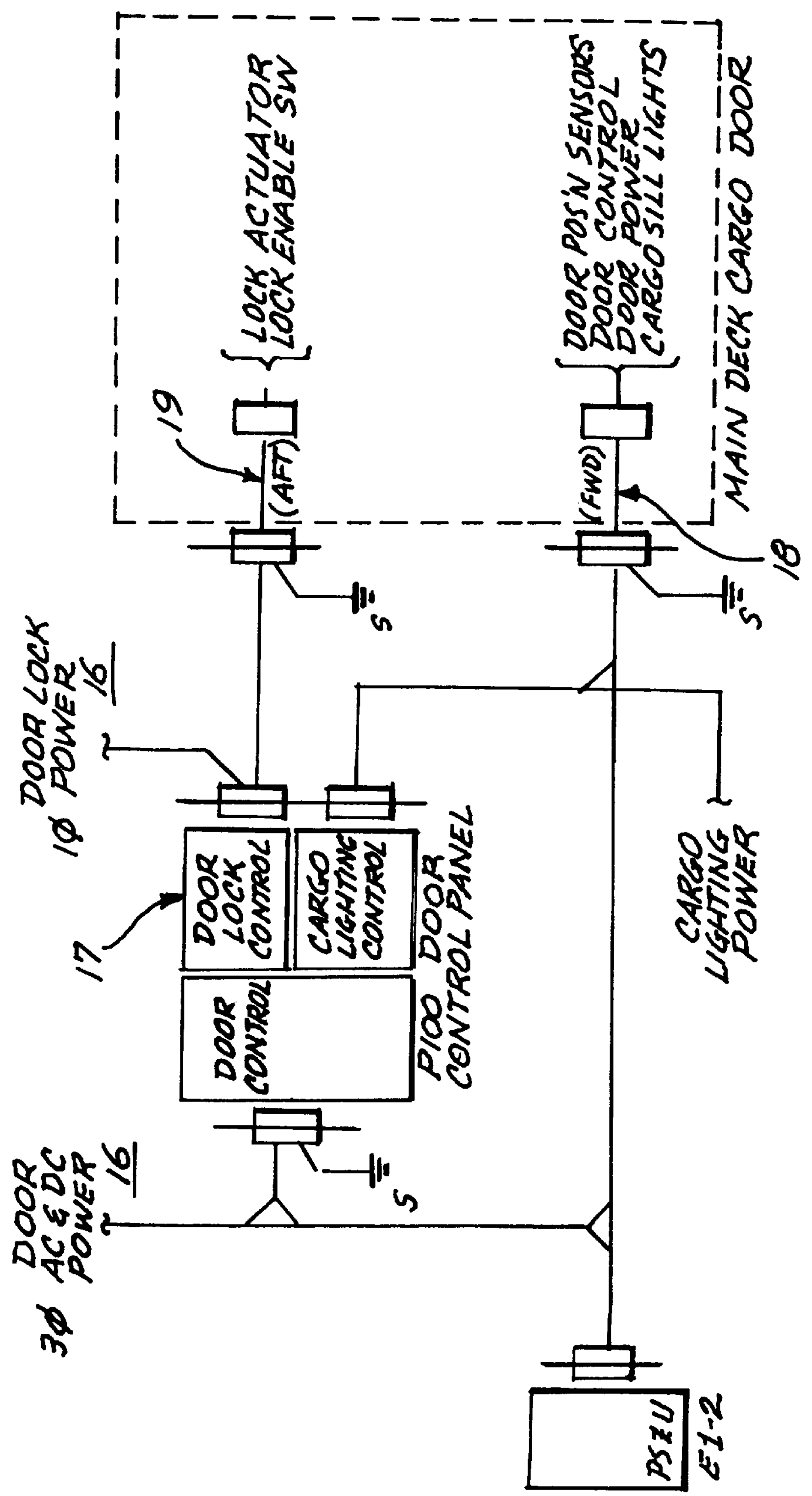
FIG. 6 is a schematic diagram of the present door control and indication wire bundles.

6. Physical barriers separate the control and lock systems inside the control panel 17. (see FIG. 6).

7. Separate wire bundles for the close/latch control systems and lock system through out the airplane including those which cross the door hinge, one on the forward side 18 of the door and the other one on the aft side 19 of the door.

8. Fire resistant wires in specific locations to protect against shorts in the event of a cargo compartment fire.

The electrical lock actuation system provides the electromechanical motion required to operate the mechanical lock system on the door. The motion is provided by a linear electromechanical actuator 1 on the door. The mechanical lock system 20 downstream of the lock actuator is similar to other existing lock mechanisms. The function of the locks is to secure the latches in the latched position. The function of the latches is to secure the cargo door to the airplane. The lock and unlock command is provided by a toggle switch 2 located on the control panel (FIG. 3 &, FIG. 4) on the flight deck near the crew entry door. This toggle switch 2 controls only the lock system. The remainder of the door control circuits are controlled by a different switch 3. Two limit switches internal to the lock actuator sense the locked and unlocked 9 positions. The lock system is enabled when a limit switch (14) senses the fully latched position of the latch/hook system.

The ground handling bus 16 provides 115 volts alternating current, 400 hertz, single phase power for the electrical lock system. This bus is only energized when the airplane is on the ground (air/ground logic in ground mode) and when either external ground power is connected to the airplane or the auxiliary power unit is operating (provided throttles are not advanced).

The lock actuator has an internal brake which allows the mechanical lock system to remain in any position commanded. The actuator also has a provision to allow manual operation in the event electrical power is not available.

The control panel, which is located at the aft end of the flight deck adjacent to the crew entry door, provides indication of fully locked 4 and fully unlocked 5. Absence of these indications indicates the lock system is neither fully locked or fully unlocked.

As can be seen from the circuit diagrams, there is no common components between the lock control system and the remainder of the door control systems.

Figure 4:
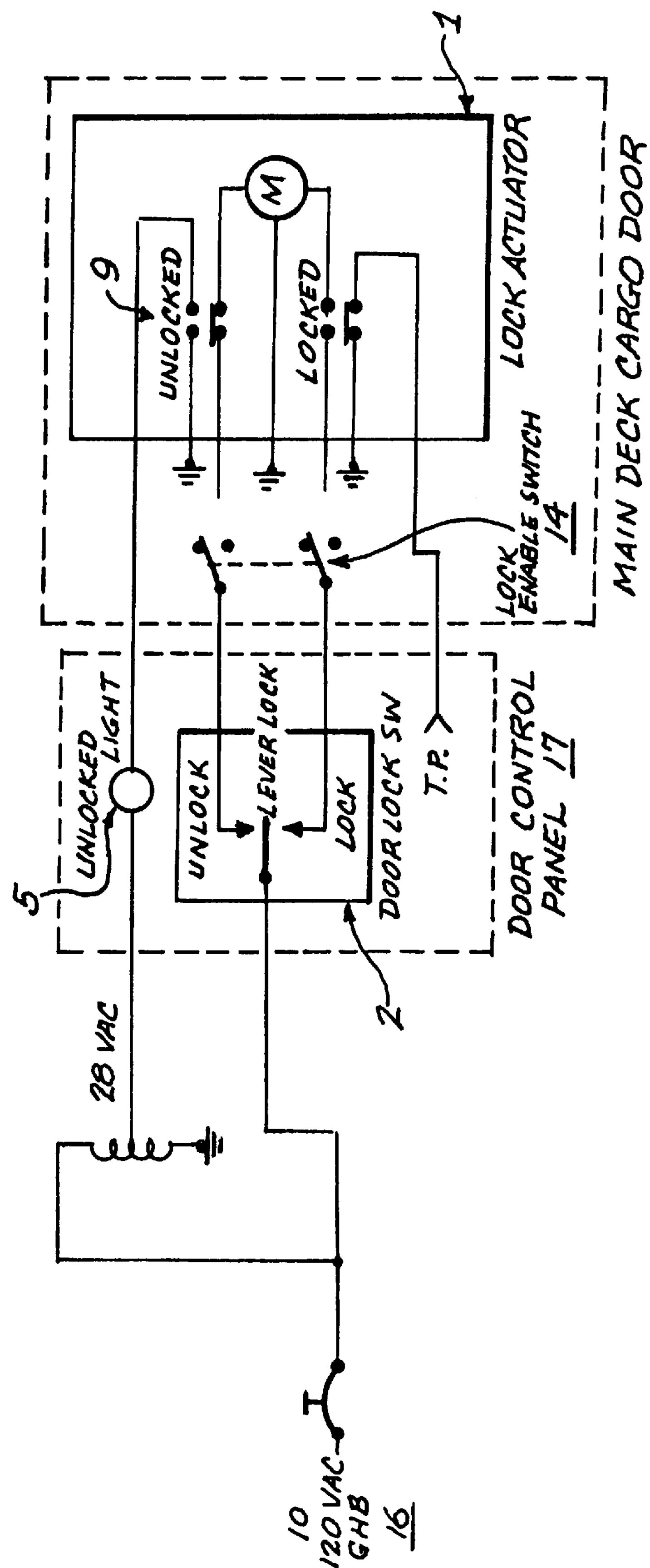
FIG. 4 is a simplified electrical schematic of the present lock system.
Figure 5:
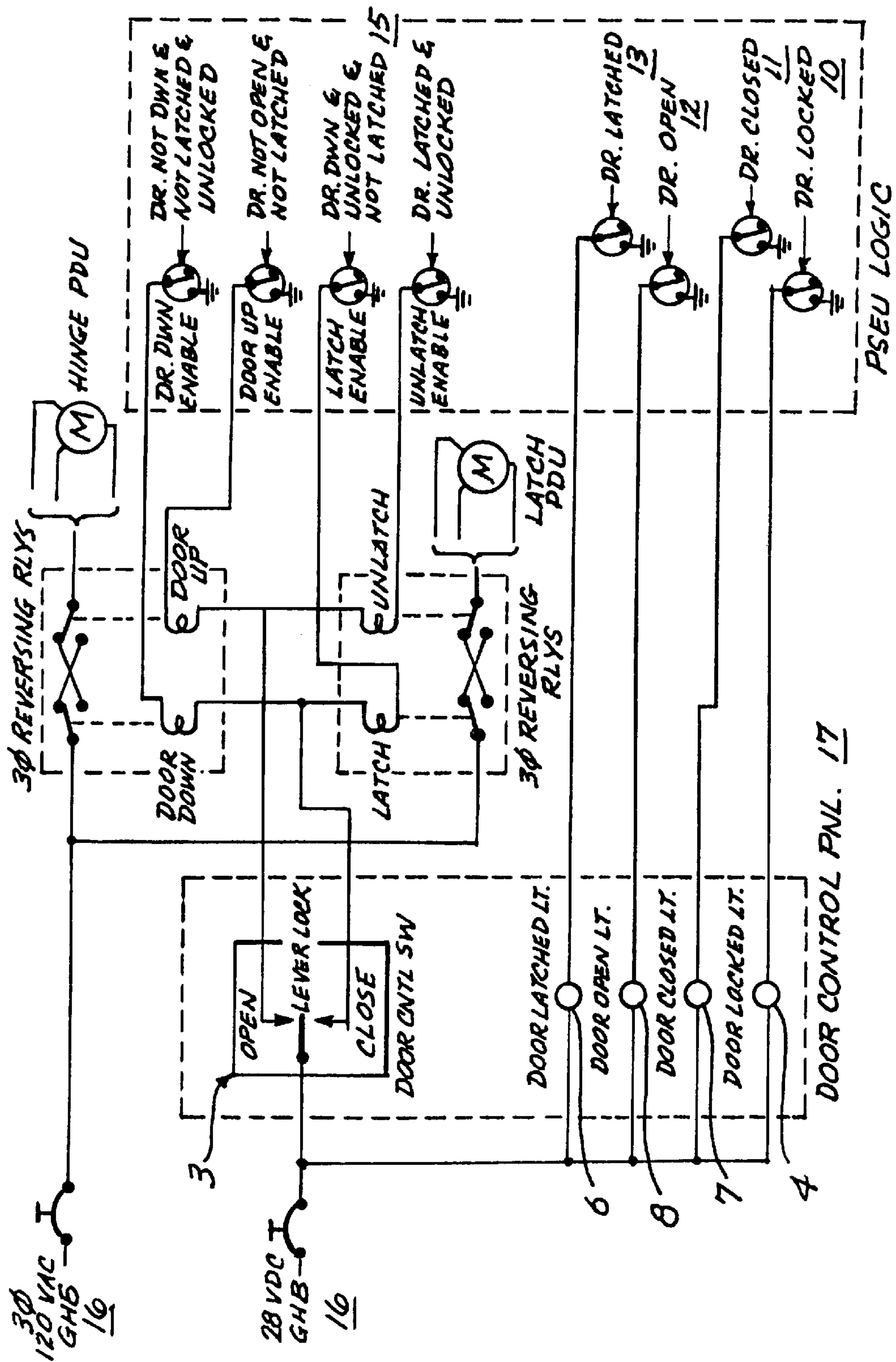
FIG. 5 is a simplified electrical schematic of the present close and latch system.

FIGS. 4 & 5 are simplified schematics of the present system showing door control relationship hereinafter described in detail.

Figure 1:
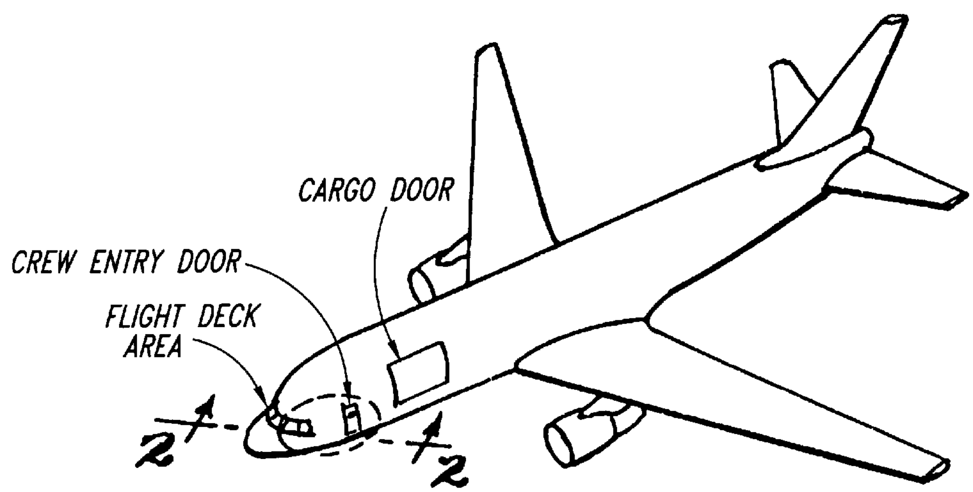
FIG. 1 is a perspective view of an aircraft showing the crew entry door and cargo door.
Figure 2:
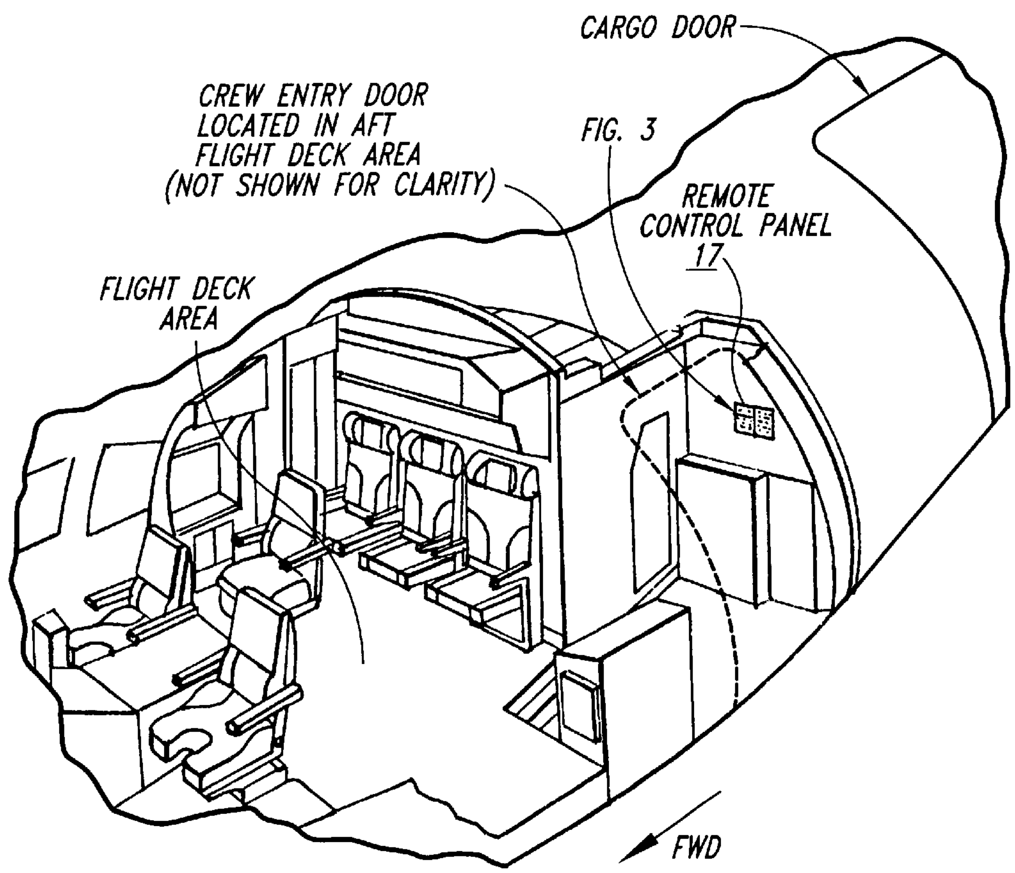
FIG. 2 is a sectional view taken along the lines 2—2 of FIG. 1 showing the flight deck and main deck cargo door control panel 17.

System functions as follows:

With the airplane shown in FIG. 1 on the ground, external ground power connected or the auxiliary power unit operating will provide power to ground handling bus 16 shown in FIGS. 4 and 5. Ground handling bus 16 is the power source to operate the door. Refer to the Door Lock Control Circuit of FIG. 4 and the Door Open/Close and Latched Control diagrams of FIG. 5.

Figure 3:
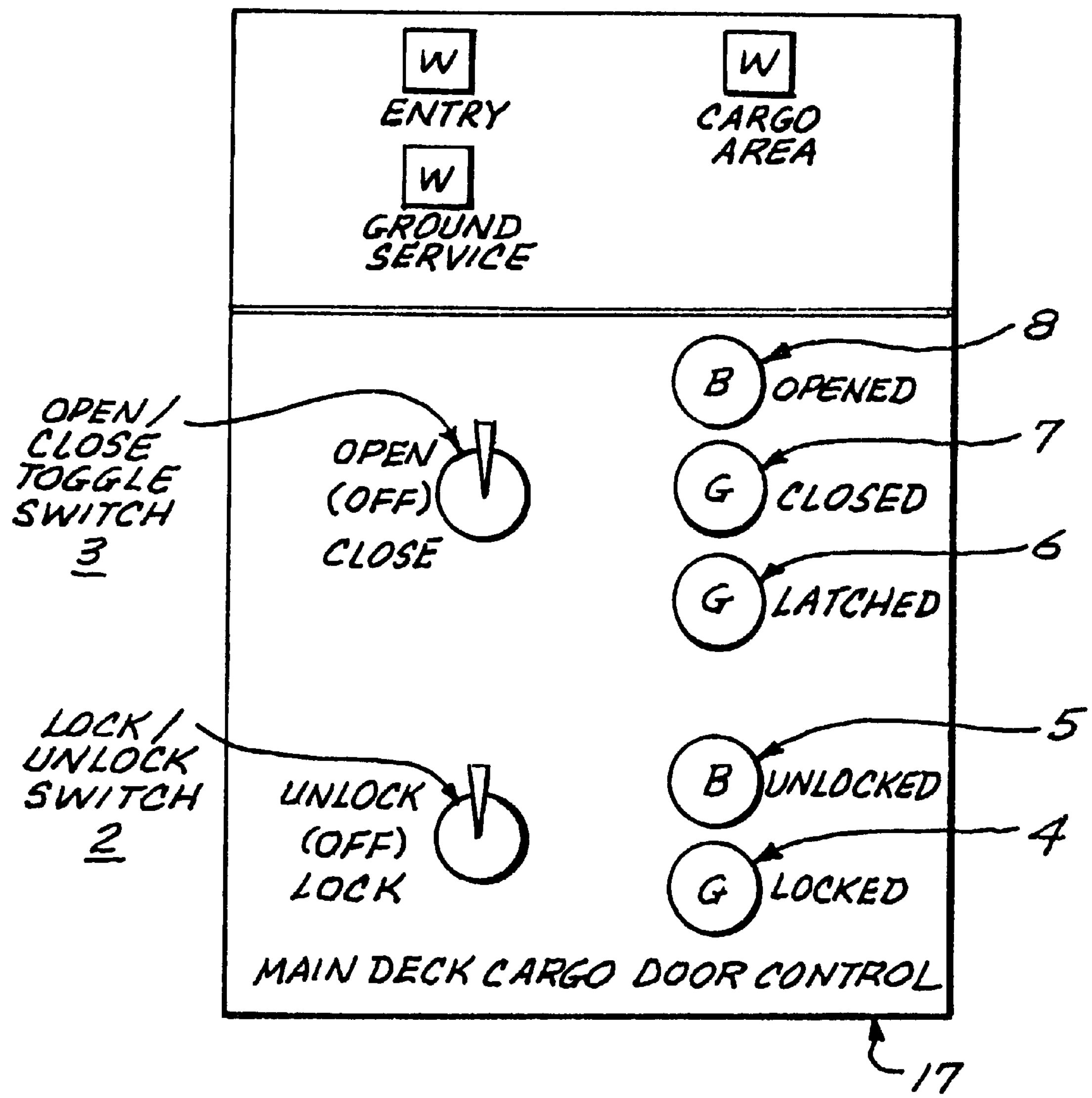
FIG. 3 is an enlarged view of the main deck cargo door control panel 17 shown in FIG. 2.

With the door in the fully closed, latched and locked position, the respective green CLOSED 7, LATCHED 6 and LOCKED 4 indication lights of FIGS. 3, 4 and 5 will be illuminated.

Figure 7:
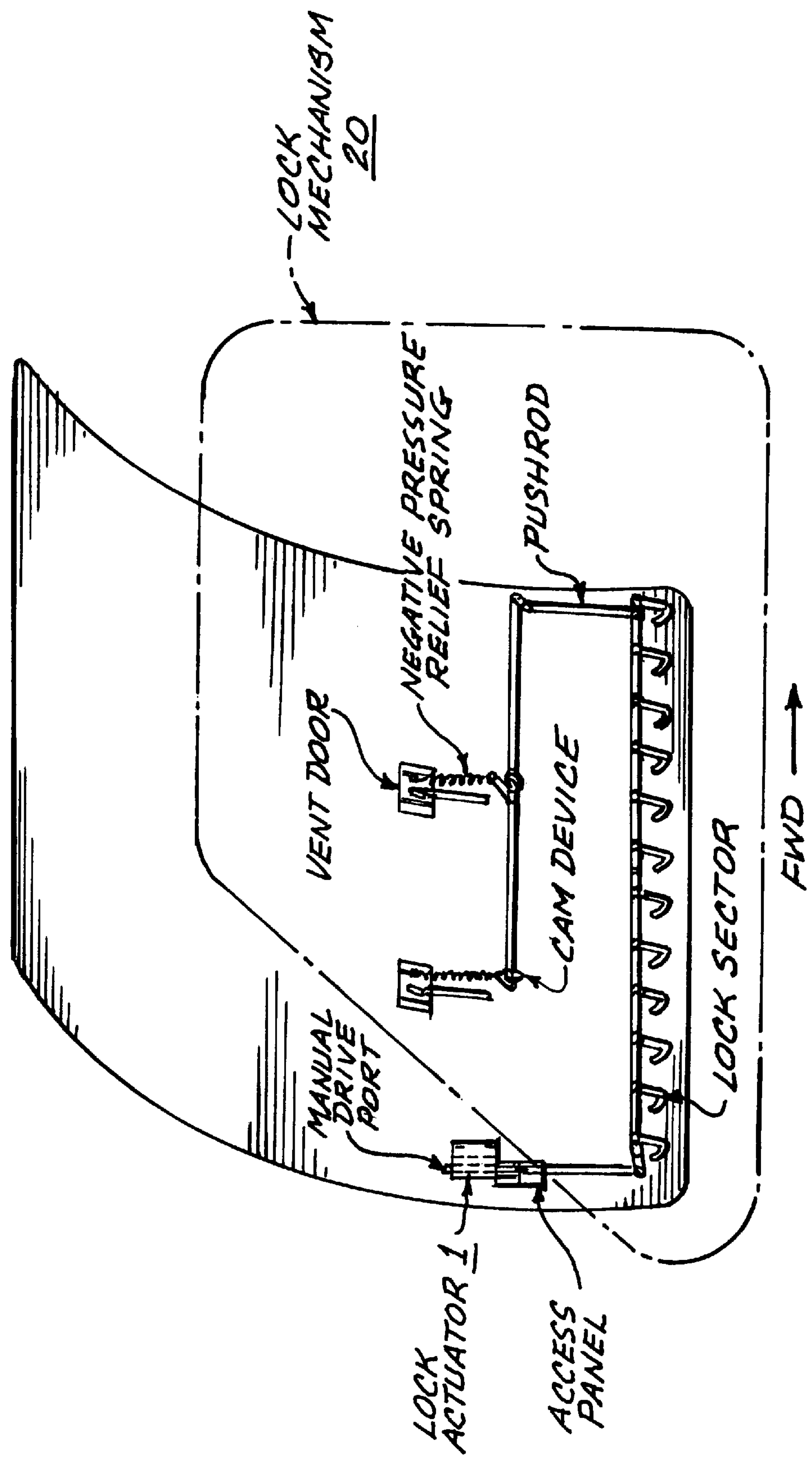
FIG. 7 is a view of the door lock mechanism.

To unlock the door, the UNLOCK/LOCK toggle switch 2 on the control panel shown in FIGS. 3 & 4 is held in the unlock position. The green LOCKED 4 light extinguishes as soon as the DR LOCKED 10 proximity switch senses target far. This will occur during the initial movement of the lock mechanism FIG. 7. Once the lock mechanism reaches the unlocked position, the UNLOCKED 9 limit switch (see FIG. 4) in the lock actuator 1 closes which illuminates the blue UNLOCKED 5 light and de-energizes the lock actuator. Release UNLOCK/LOCK toggle switch. Note: The absence of either light indicates the lock mechanism is neither fully locked or fully unlocked. Also, the latch/hook system can not be energized until the latch enable proximity switch 15 senses target near by the lock system which occurs when the lock system is in the fully unlocked position.

To open the door, the OPEN/CLOSE toggle switch 3 on the control panel of FIG. 3 is held in the open position. The green LATCHED 6 light extinguishes as soon as the DR LATCHED 13 proximity switch of the circuit schematic of FIG. 5 senses target far. This will occur during the initial movement of the latch/hook mechanism. Soon after, the green CLOSED 7 light extinguishes as soon as the DR CLOSED 11 proximity switch senses target far. This will occur during the initial movement of the door as the door is pushed out of the door opening by the latch/hook mechanism. Once the door is unlatched and pushed out, the latch/hook system is de-energized and power is transferred to the lift system. Once the door reaches the full open position, the DR OPEN 12 proximity switch senses target near which illuminates the blue OPENED 5 light (seen in FIGS. 3 and 5) and de-energizes the lift system. Release OPEN/CLOSE toggle switch. Note: The absence of any light indicates not fully opened, not fully closed and/or not fully latched respectively.

As herein before described, the cargo door close and door lock operations are the reverse of the open and unlock procedure. The indication lights will respond accordingly.

It should be noted that the lock system can not be energized until the lock enable switch 14 is actuated by latch/hook system which occurs when the latch/hook system is in the fully latched position. Also, the central circuiting provides that at any position of the door systems, a minimum of one light is illuminated thereby providing an indication that power is available.

Those skilled in the art upon a reading of this specification will appreciate that features of the present system provide a cargo door electric control system whose electric lock system provides an equivalent level of inherent protection against common mode electrical failures (as a typical manual lock actuation system) attempting to unlock and unlatch the pressurized airframe load carrying non-plug cargo door.

The preceding and further advantages will appear to those skilled in the art upon a reading of the foregoing specification.

While preferred embodiment of the invention has been illustrated and described, variations will be apparent to those skilled in the art. Accordingly, the invention is not to be limited to the specific embodiment illustrated and described, and the true scope of the invention is to be determined by reference to the following claims.

What is claimed is:

1. In combination in an aircraft having a flight deck area and a crew entry door:

a pressurized load carrying non-plug cargo door;

a cargo door control panel disposed of the aft end of the flight deck area of the aircraft adjacent to the crew entry door;

said cargo door control panel coupled to said cargo door for controlling the operation of said cargo door remotely; and, an all electric control system having an electric lock system isolated to preclude common mode electrical failures from unlocking and unlatching the cargo door.

2. An aircraft according to claim 1, in which the lock system and the close/latch control system have different components.

3. An aircraft according to claim 1 or 2 in which the electric control system comprises one or more latch actuators and one or more lock actuators to which the electric lock system is connected, and wherein the power requirements for the latch and lock actuators are three phase power and single phase power, respectively.

4. An aircraft according to claim 3, wherein only the latch control system uses a Proximity Switch Electronics Unit (PSEU).

5. An aircraft according to claim 2 in which the CLOSE/LATCH control system and LOCK system have separate wire bundles.

6. In combination in an aircraft having an aircraft flight deck:

a pressurized airframe load carrying non-plug cargo door located remote from the aircraft flight deck;

a crew entry door located in the aircraft flight deck;

a cargo door control panel disposed at the aft end of the aircraft flight deck area adjacent to the crew entry door;

said cargo door control panel coupled to said cargo door for controlling the operation of said cargo door remotely; and, an all electric control system having an electric lock system isolated to preclude common mode electrical failures from unlocking and unlatching the cargo door.

* * * * *